United States Patent [19]

Polston et al.

[11] Patent Number: 5,175,053
[45] Date of Patent: Dec. 29, 1992

[54] PELLETIZER FEED ROLLER

[75] Inventors: Wallace K. Polston, Union Grove; Janet R. Buetow, Kansasville, both of Wis.

[73] Assignee: American Roller Company, Union Grove, Wis.

[21] Appl. No.: 672,225

[22] Filed: Mar. 20, 1991

[51] Int. Cl.$^5$ .............................................. B32B 15/00
[52] U.S. Cl. .................................... 428/379; 428/380; 428/384; 428/389; 428/34.6; 428/615; 29/132; 29/121.1
[58] Field of Search ............... 428/379, 380, 384, 389, 428/615, 621, 622, 623, 624, 626, 632, 633, 630, 34.6, 34.7; 29/132, 121.1

[56] References Cited

U.S. PATENT DOCUMENTS

| | | | |
|---|---|---|---|
| 3,942,230 | 3/1976 | Nalband | 29/132 |
| 4,991,501 | 2/1991 | Yokoyama et al. | 29/132 |

FOREIGN PATENT DOCUMENTS 2154614  11/1987  United Kingdom .

Primary Examiner—Patrick J. Ryan
Assistant Examiner—N. Edwards
Attorney, Agent, or Firm—Quarles & Brady

[57] ABSTRACT

A pelletizer feed roller comprises a metal core having a ceramic layer with a rough outer surface bonded to the core. The outer surface of the ceramic layer is sealed with a penetrating sealer containing organic solvent and phenolic resin to prevent moisture contamination of the ceramic layer without adversely affecting the coefficient of friction of the feed roller.

4 Claims, 1 Drawing Sheet

PELLETIZER FEED ROLLER

FIELD OF THE INVENTION

The present invention relates to a roller having a high coefficient of friction which can be used to feed strands of plastic into a pelletizer.

BACKGROUND OF THE INVENTION

At the present time, rollers are used to feed strands of plastic into the pelletizers which convert the strands to free flowing plastic pellets. These so-called feed rollers are made of stainless steel and have an outer surface which is grooved or knurled to provide a high coefficient of friction so that they will more efficiently feed the strands of plastic into the pelletizer. Unfortunately, such knurled or grooved stainless steel rollers are expensive to make and have a relatively short useful life.

It would be advantageous to have an improved pelletizer feed roller which is both less expensive to make and which has a longer useful life than the prior art feed rollers.

SUMMARY OF THE INVENTION

Objects of the present invention are to disclose an improved pelletizer feed roller and a novel method of making such a roller.

The pelletizer feed roller of the present invention comprises a roller core having a ceramic layer bonded to that core. The ceramic layer has an outer surface with a roughness of about Ra 200 to about 1000 microinches and it is sealed with a sealer which penetrates the outer surface of the ceramic layer to prevent moisture contamination but does not reduce the coefficient of friction.

In the inventive method of making a roller, a steel core with a rough outer surface is coated with a ceramic layer, and the ceramic layer is sealed with a penetrating sealer containing organic solvents. When the sealer has dried the pelletizer feed roller is ready to use without any further treatment.

It will be apparent to those skilled in the art that the foregoing objects and other advantages of the invention can be obtained by practicing the invention as described herein.

DESCRIPTION OF THE PREFERRED EMBODIMENT

Figure 1:
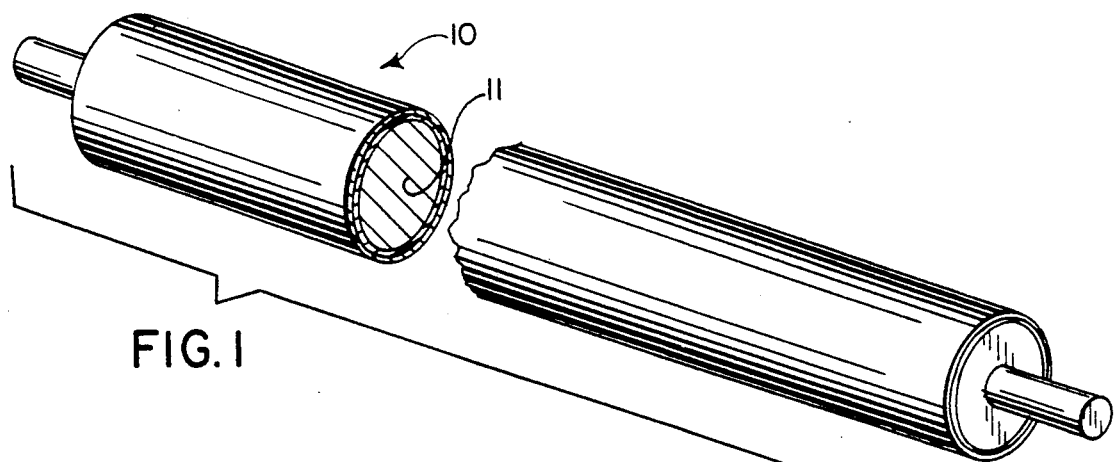
FIG. 1 is a perspective view, partly in section, of a roller of the present invention.
Figure 2:
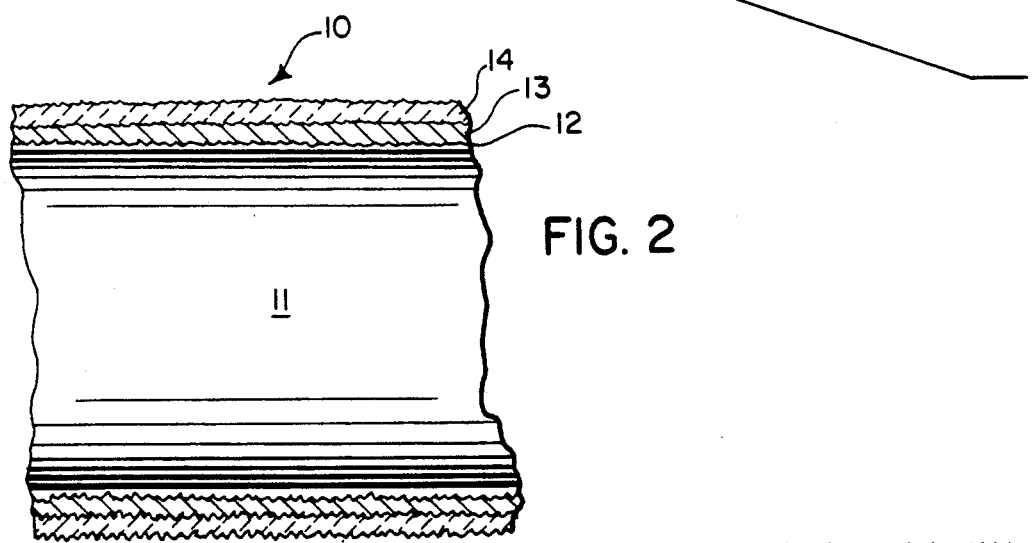
FIG. 2 is an enlarged cross sectional view of the roller of FIG. 1.
Figure 3:
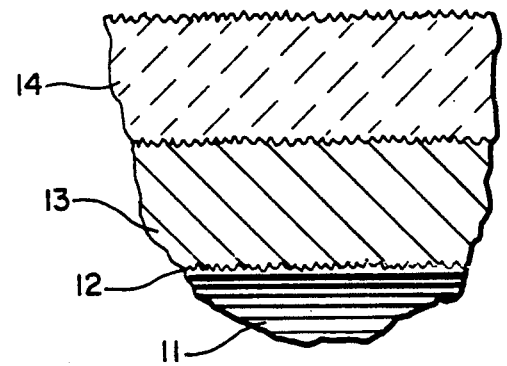
FIG. 3 is an enlarged portion showing the wall of a roller of FIG. 1 before it has been sealed.

In the preferred embodiment of the invention seen in the drawings, the pelletizer feed roller 10 has an inner steel core 11 with a rough outer surface 12 (e.g. Ra 850 microinches). There is a stainless steel coating 13 on the surface 12 and an outer ceramic layer 14 on the coating 13. The ceramic layer 14 has an uneven outer surface having an Ra of about 500 to about 800 microinches. As seen only in FIG. 4 the ceramic layer 14 has a seal coat 15 to prevent moisture contamination.

The sealed ceramic surface exhibits good abrasion resistance and has an acceptable coefficient of friction.

In the preferred method of the present invention, a steel core is first grit blasted to remove any surface contamination. The outer surface of the core has a typical roughness of Ra about 1,000 microns per inch. The core is allowed to cool down and then thermal sprayed with a layer of No. 2 stainless steel, which is about 0.001 to about 0.100 inches thick and has a surface Ra of about 1,000 micro inches. After cooling down the roller is then thermal sprayed with a chromium oxide-silica powder which is built up to the desired wall thickness. The layer of ceramic preferably has a typical total wall thickness of about 0.002 to about 0.050 inches and a typical Ra of 500 microns per inch.

The preferred chromium oxide is Metco 136° F. and the powder is thermal or plasma sprayed. The ceramic layer is applied in steps and the roller and the ceramic layer are allowed to cool down between steps during the buildup process. Once the ceramic layer is the desired thickness it is cooled down to room temperature and the ceramic layer is sealed.

The preferred ceramic mixture for use in the method of the present invention is a uniform blend of 92% to about 95% of chromium oxide and about 2% to 5% of silica powder. The mixture also may contain up to 3% of other ingredients, such as titanium oxide.

The ceramic layer is preferably applied by use of a plasma or thermal sprayer. The ceramic layer is preferably applied stepwise in thin layers until the desired thickness is achieved.

The seal coat is preferably applied from an aerosol (METCOSEAL AP from Metco Inc.) to form a thin coat of the (0.001 inches or less) which has no effect on the Ra or the coefficient of friction of the ceramic layer.

Figure 4:
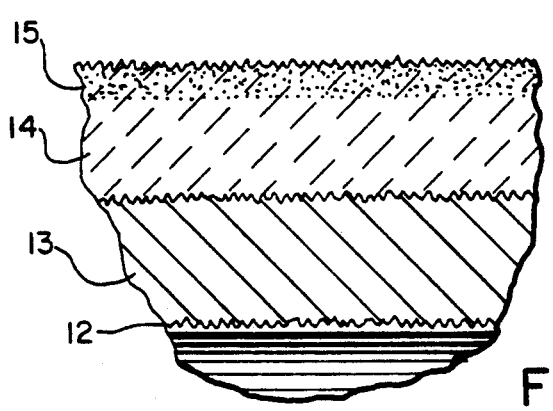
FIG. 4 is a view like FIG. 3 showing the wall after it has been sealed.

As seen only in FIG. 4 the outer surface of the ceramic layer 14 is sealed with a moisture resistant sealer 15.

The seal coat is formed by a penetrating liquid which may be an organic solvent, such as isobutyl acetate. However, preferably it is the mixture of solvents and phenolic resin which is commercially available as an aerosol spray from Metco of Westbury, N.Y., under the name METCOSEAL -AP. The preferred sealer contains the following ingredients:

|  | percent weight |
|---|---|
| Toluene | 8.13 |
| Ethanol | 14.62 |
| Isopropanol | 9.83 |
| N-Butanol | 6.09 |
| Isobutyl Acetate | 37.40 |
| Methyl N-Amyl Ketone | 4.38 |
| Xylene | 9.10 |
| Phenol | 5.0 |

It is inflammable and should be handled with great care.

The invention is further illustrated by the following example:

EXAMPLE 1

A prototype core having a diameter of 2.200 inches and a length of 21.5 inches was grit blasted to remove any surface contamination, allowed to cool and then thermosprayed with Metco No. 2 stainless steel wire at 5000°-7000° F. using a Metco 6R wire arc sprayer. The stainless steel layer was built up to a wall thickness of 0.015 inches and it had a surface Ra of 850 microinches. After cooling down, the roller was sprayed with a chromium oxide-silica powder using a Metco plasma sprayer. The ceramic layer was built up in 0.001″ steps to a wall thickness of 0.010 inches. It had a surface Ra of about 500 to about 800 microinches. The thus formed roller was allowed to cool down to room temperature and then sealed by spraying the outer surface of the ceramic layer with an aerosol of Metcoseal AP. The sealer was applied to form a thin coat of about 0.001 inches. Upon drying the roller was used as a pelletizer feed roller and was found to have a superior useful life as compared to the prior art stainless steel grooved or knurled rollers.

It will be apparent to those skilled in the art that a number of changes or modifications can be made without departing from the spirit and scope of the present invention. Therefore, the invention is not to be limited except by the claims which follow.

We claim:

1. A pelletizer feed roller, said roller comprising an inner roller core; a ceramic layer bonded to the core, said ceramic layer having an outer surface with an Ra of about 200 to about 1000 microns per inch; and, a seal coat penetrating the outer surface of the ceramic layer and protecting the outer surface of the ceramic layer from moisture contamination without significantly reducing surface roughness and coefficient of friction of the outer surface of the ceramic layer.

2. A feed roller of claim 1 in which the roller core is of steel.

3. A feed roller of claim 1 in which the ceramic layer is a sprayed layer comprises of chromium oxide and a silica powder.

4. A feed roller of claim 1 in which the seal coat is formed by an organic solvent and phenolic resin mixture on the outer surface of the ceramic layer.

* * * * *

UNITED STATES PATENT AND TRADEMARK OFFICE
CERTIFICATE OF CORRECTION

PATENT NO. : 5,175,053
DATED : December 29, 1992
INVENTOR(S) : Polston, Buetow It is certified that error appears in the above-identified patent and that said Letters Patent is hereby corrected as shown below:

Col. 2, line 35   "METCOSEAL AP" should be --METCOSEAL-AP--.

Col. 4, line 16   "Comprises" should be --comprised--.

Signed and Sealed this

Thirtieth Day of November, 1993

Attest:

BRUCE LEHMAN

Attesting Officer

Commissioner of Patents and Trademarks